Jan. 13, 1953

R. A. BRODING

2,625,583

MAGNETIC INDUCTION WELL-LOGGING INSTRUMENT

Filed Oct. 28, 1950

INVENTOR.
ROBERT A. BRODING

BY

*Sidney A. Johnson*

ATTORNEY

Jan. 13, 1953 — R. A. BRODING — 2,625,583
MAGNETIC INDUCTION WELL-LOGGING INSTRUMENT
Filed Oct. 28, 1950 — 3 Sheets-Sheet 2

Fig.3

INVENTOR.
ROBERT A. BRODING
BY Sidney A. Johnson
ATTORNEY

Jan. 13, 1953 R. A. BRODING 2,625,583
MAGNETIC INDUCTION WELL-LOGGING INSTRUMENT
Filed Oct. 28, 1950 3 Sheets-Sheet 3

*INVENTOR.*
ROBERT A. BRODING
BY
*Sidney A. Johnson*
ATTORNEY

UNITED STATES PATENT OFFICE 2,625,583

MAGNETIC INDUCTION WELL-LOGGING INSTRUMENT

Robert A. Broding, Dallas, Tex., assignor, by mesne assignments, to Schlumberger Well Surveying Corporation, Houston, Tex., a corporation of Delaware Application October 28, 1950, Serial No. 192,751

15 Claims. (Cl. 175—182)

This invention relates to geophysical exploration, and more particularly to improvements in the simultaneous and separate determination of electrical and magnetic characteristics of the medium penetrated by a bore hole. This invention is an improvement upon the system disclosed in my Letters Patent 2,535,666, granted December 26, 1950, upon application Serial No. 72,451 for "Electrical Logging System," filed January 24, 1949.

In geophysical exploration, the values of, or the variations in, any one of several physical and electrical properties of the various media forming strata in the earth are susceptible of measurement. Many systems are known for making measurements of one or more of these properties. However, much has been left to be desired in systems for measuring variations in electrical resistivity and magnetic permeability of subsurface formations, particularly in the accuracy and resolution of two characteristics, as conductivity and susceptibility.

In carrying out the invention in one form thereof, there is provided inductive coupling means suitably suspended in a bore hole for movement adjacent earth formations. Alternating currents of differing frequency are applied to the inductive coupling means for magnetic coupling with the earth formations. By means of a detector responsive to one frequency, the in-phase component of alternating current is measured to provide an indication of the electrical conductivity of the earth formations, while a second detector responsive only to the other frequency is utilized to measure the out-of-phase component thereof to indicate the magnetic susceptibility of the earth formations. Both measurements take place concurrently, thus eliminating any positional error which might otherwise occur in systems where successive measurements are made of the earth formations. There is at all times positional correlation of the two parameters, electrical conductivity and magnetic susceptibility, with respect to the formations through which the bore hole extends.

In accordance with this invention, these measurements of the changes in two parameters are made with high resolution so as to be representative of any abrupt local variations to minimize indefiniteness as to the exact position of the abrupt local variation. While having high precision, the system is not disturbed by bore hole contaminations such as small bits of metal.

More specifically in accordance with this invention, changes in magnetic susceptibility and electrical conductivity are measured and indicated as a function of the position of the measuring means along the bore hole. There is preferably included in an arm of at least one balanceable network an induction coil inductively coupled to the medium surrounding it, as to the strata around the bore hole. Alternating currents of two different frequencies may be applied to a single inductance coil, or two coils may be provided, to each of which there is applied alternating current of different frequency, each coil being connected in its own balanceable network. By means of suitable filters the alternating currents may be derived from a single source of multiple frequency, each output circuit of each network being connected to a detector responsive to only one of the selected frequencies, or separate sources of different frequency may be utilized.

In one embodiment, the system for carrying out the present invention includes an exploration unit, sometimes referred to as a "bomb," carrying the balanceable circuit means and a plurality of phase-sensitive, frequency-selective detectors, with the inductive means arranged to be magnetically coupled to the surrounding medium. The inductive means is connected to the balanceable circuit means to cause an unbalance thereof representative of changes in impedance. The balanceable circuit means is connected to the alternating voltages of different frequencies, and provides signals to the detectors representative of the change in impedance of the inductive means. The detectors measure in-phase and out-of-phase components thereof as indications of changes in magnetic susceptibility and electrical conductivity.

In another embodiment of this invention, the separate response to each of a plurality of alternating voltages is enhanced by a circuit consisting of a plurality of Wheatstone bridges and an inductance coil with a plurality of windings thereon, each balanceable bridge being connected to a separate winding of the inductance coil. In this manner the circuit for measurement of each parameter is substantially separated from the influence of the other circuit, and each winding can be so disposed and arranged on the inductance coil to provide maximum sensitivity for the parameter whose changes are being measured by that winding.

For a more detailed explanation of the invention and for further objects and advantages thereof, reference may now be had to the following description taken in conjunction with the drawings in which.

Figure 1:
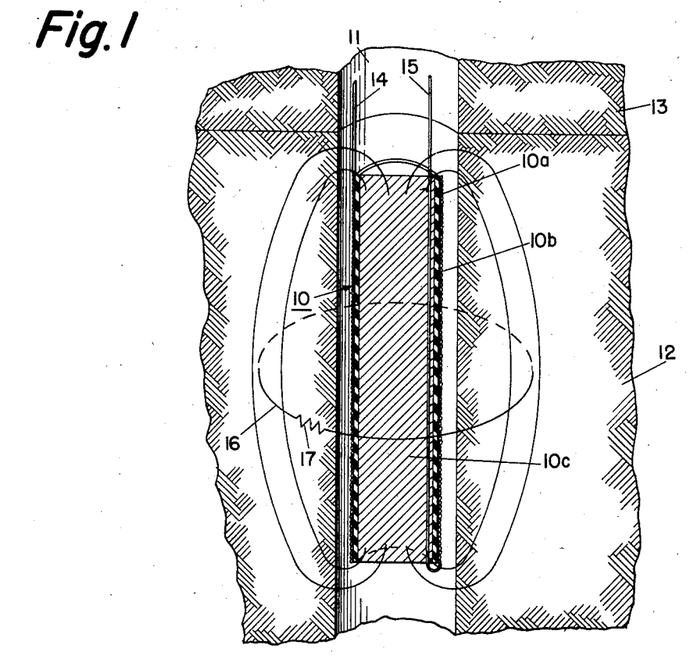
Fig. 1 is a schematic diagram of one embodiment of the inductance coil of the present invention, illustrating its inductive coupling to the medium surrounding the bore hole.

Referring now to Fig. 1, an inductance coil assembly 10 is shown positioned in a bore hole 11 adjacent an earth formation 12 located just below an earth formation 13 having different electrical characteristics. Conductors 14 and 15 extend upwardly from winding 10b. The turns of winding 10b rest against insulation 10a which separates the turns of the winding 10b from a core 10c of material of high permeability selected from materials suitable for magnetic cores at the frequencies supplied to the coil 10. Powdered iron is one suitable material for the core. A core of high-permeability material increases the magnetic flux flowing through the coil assembly 10 and material 12, and increases sensitivity to external changes, i. e., to changes in the material 12 surrounding the coil 10, because the core 10c removes practically all of the reluctance inside coil 10 and leaves only the reluctance of the external path through material 12.

The winding 10b is relatively long compared with the diameter of the bore hole in order that the current sheath linked thereto in the surrounding medium or earth formation shall be as large as possible. This current sheath is schematically represented in Fig. 1 as a single-turn secondary winding 16 including series resistance 17. Because of the length of the current sheath and the nature of the current flowing in the surrounding earth formation, the equivalent secondary resistance 17 will markedly vary with variations in the electrical conductivity thereof. Likewise, because of the reluctance of the magnetic path through material 12, there will be a change in the reactance of winding 10b with changes in magnetic susceptibility of material 12, causing in induced reactive component to be added to the impedance of winding 10b.

Figure 2:
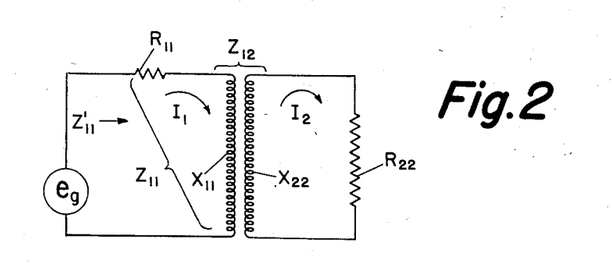
Fig. 2 is a schematic diagram of the equivalent transformer illustrated in Fig. 1.

By applying to conductors 14 and 15 alternating currents of substantially differing frequency, one a multiple of the other or not harmonically related to each other, substantial improvement in sensitivity and measurement of resistivity and susceptibility of the earth formations is accomplished. The reasons for the improved operation will now be developed in terms of an analysis of the equation for the impedance seen in the primary winding of a transformer. In Fig. 1, winding 10b is the primary winding and an equivalent secondary is represented by single-turn winding 16. The loading of winding 10b due to its coupling to the adjacent earth formation is represented as resistor 17 in series with winding 16. This transformer circuit can be shown schematically as in Fig. 2, where:

$e_g$ = equivalent generator voltage of the source supplying winding 10b;

$R_{11}$ = internal resistance of the generator plus the resistance of conductors 14 and 15, and of winding 10b;

$X_{11} = j\omega L_1$, inductive reactance of winding 10b;

$Z_{12}$ = mutual impedance between primary and secondary;

$X_{22} = j\omega L_{22}$, inductive reactance of winding 16;

$R_{22}$ = resistive loading of earth formation reduced to equivalent secondary resistor 17;

$I_1$ = primary current; and $I_2$ = equivalent secondary current in winding 16 and resistor 17.

The effect of the magnetic susceptibility of a surrounding earth formation is primarily upon the inductance L of primary winding 10b. The equation for this relation has the following form:

$$L = 1.25 N^2 P \times 10^{-8} \text{ henries} \quad (1)$$

where $N$ = number of turns $P$ = permeance of the magnetic paths in coil 10 and in the surrounding medium, and is a function of magnetic susceptibility and magnetic flux paths.

Since $X_{11} = j\omega L_{11}$, where $j$ = mathematical operation symbol indicating quadrature phase relation, $\omega = 2\pi$ times frequency, and $L_{11}$ = primary inductance, $X_{11}$ can be expressed approximately as:

$$X_{11} = j\omega\, 1.25 N^2 P \times 10^{-8} \text{ reactance ohms} \quad (2)$$

While the absolute value of $X_{11}$ may differ somewhat from this equation, the important fact is that it varies linearly with permeance P and thus varies linearly with magnetic susceptibility.

The effect of the electrical conductivity of the surrounding medium is primarily upon the equivalent secondary coil 16 and resistor 17. The equation for the equivalent transformer of Fig. 2 has the following general form:

$$Z'_{11} = Z_{11} - \frac{Z_{12}^2}{Z_{22}} \quad (3)$$

where $$Z = R_{22} + jX_{22}$$

In the special case of a coil in a circuit with metal in its magnetic field, $Z_{12}$ will be $-j\omega M$, where $M$ = mutual inductance. Then, substituting for $Z_{12}$ and $Z_{22}$ in Equation 3:

$$Z'_{11} = Z_{11} + \frac{\omega^2 M^2}{R_{22} + j\omega L_{22}} \quad (4)$$

By rationalizing and simplifying the second term of Equation 4, there is obtained:

$$Z'_{11} = R_{11} + jX_{11} + \frac{\omega^2 M^2 R_{22}}{R_{22}^2 + (\omega L_{22})^2} - \frac{j\omega^2 M^2 L_{22}}{R_{22}^2 + (\omega L_{22})^2} \quad (5)$$

Figure 3:
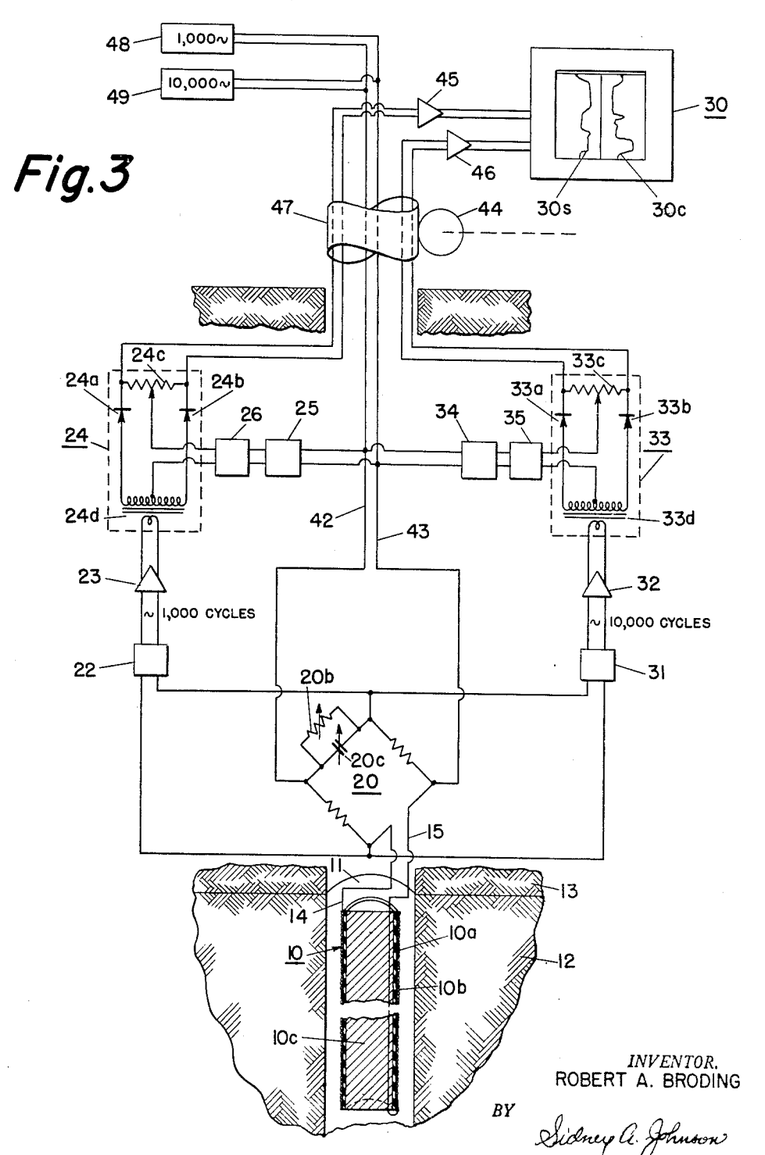
Fig. 3 is a diagrammatic view of an embodiment of the invention utilizing a single-winding inductance coil and a single-bridge balanceable circuit.

For purposes of analysis of performance, the resistive expression $R_{11}$ will be ignored because $R_{11}$ is predominantly the resistance of bridge 20 of Fig. 3 and is not affected by movement of said unit 10 in bore hole 11. With $R_{11}$ omitted, $$Z_{coil} = jX_{11} + \frac{\omega^2 M^2 R_{22}}{R_{22}^2 + (\omega L_{22})^2} - \frac{j\omega^3 M^2 L_{22}}{R_{22}^2 + (\omega L_{22})^2} \quad (6)$$

Changes in $X_{11}$ have already been shown to depend primarily upon magnetic permeance and hence upon the magnetic susceptibility of the material in the magnetic flux path.

In the case of winding 10b, $R_{22}$ is resistor 17 and $L_{22}$ is the inductance of winding 16. Hence, changes in electrical conductivity will change $R_{22}$ in the term $$\frac{\omega^2 M^2 R_{22}}{R_{22}^2 + (\omega L_{22})^2}$$

Since the inductance $L_{22}$ of coil 16 is very small, the factor $(\omega L_{22})^2$ can be ignored at audio frequencies. This allows an approximate expression for the induced resistive component as $$\frac{(2\pi f)^2 \cdot M^2}{R_{22}}$$

from which it can be seen that the induced resistive component will vary directly with frequency squared and inversely with the value of resistor 17. Thus, the use of a higher frequency for measurement of the effects on winding 10b that are induced by changes in electrical conductivity will increase sensitivity to such changes by a factor equal to the square of the increase in frequency.

Since inductance $L_{22}$ of winding 16 is very small, the induced reactance due to the third term of Equation 6, namely, $$\frac{j\omega^3 M^2 L_{22}}{R_{22}^2 + (\omega L_{22})^2}$$

can be neglected.

Now that the basic theory underlying the invention has been set forth, the embodiment illustrated in Fig. 3 will be described in detail. The winding 10b is disposed in bore hole 11 and is relatively long compared with the diameter of bore hole 11. In order to accentuate the response due to changes in resistance of the earth formations, winding 10b is energized with alternating current of high frequency, of the order of 10,000 cycles per second. Any suitable source 49 of such high frequency may be utilized. It is supplied to winding 10b by way of a bridge 20. A low-frequency alternating current is also supplied to winding 10b in order to produce the impedance variation for measurement of susceptibility. Any suitable low-frequency source 48 may be used to energize winding 10b by way of bridge 20. By utilizing the different frequencies, greater resolution of impedance changes is obtained with greater ease of separation of the two for measurement of the in-phase component of the 10,000 cycle voltage for resistance and the out-of-phase component of the 1,000 cycle voltage for susceptibility. As can be seen from Equation 2, there is minimum loss of sensitivity by the use of the lower frequency current for measurement of susceptibility since frequency appears only to the first power. Hence, in accordance with the present invention maximum overall sensitivity is obtained for the simultaneous measurements of resistance and susceptibility by the use of the two alternating currents of different frequency, the higher frequency being used for the resistance measurement, indicative of conductivity.

The energization of winding 10b is by way of the balanceable network 20, of the Wheatstone bridge type, which bridge is unbalanced in accordance with variations in conductivity and susceptibility of the earth formations.

When the bridge 20 is unbalanced, a filter 22 applies to an amplifier 23 the lower frequency 1,000 cycle voltage, excluding the higher frequency voltage. The output of amplifier 23 is applied to a phase-sensitive frequency-selective detector 24 by way of a transformer 24d. While those skilled in the art may utilize any suitable detector, there is illustrated one of the type in which a voltage of the lower frequency of 1,000 cycles per second is applied by filter 25 to a phase-shifter 26 and thence across a diagonal, or to the center taps, of the detector 24. The phase-shifter 26 is adjusted until the voltage applied to detector 24 is "in phase" with the quadrature component of the voltage applied by way of the secondary winding of transformer 24d. The quadrature component of the 1,000 cycle voltage applied by transformer 24d from bridge 20 varies with the susceptibility of the earth formations and the corresponding unbalance of bridge 20. Hence, the rectifiers 24a and 24b of of the detector produce across the output, or loading resistor 24c, a unidirectional or direct-current output whose magnitude will be proportional to the induced reactive component which changed the impedance of winding 10b to give rise to the bridge unbalance. As already explained, that reactive component varies with susceptibility and hence the detector output may be connected directly to an indicating and/or recording instrument, or, as shown, by way of an amplifier 45 to a recorder 30. The record sheet of recorder 30 has associated therewith two markers, the first producing on the sheet a record 30s of change of susceptibility and the other a record 30c of the change in conductivity of the earth formations. The manner in which the latter marker is driven is explained in the immediately following description. The record sheet will be driven in correlation with position of the winding 10b in the bore hole for logging in relation to depth the two desired parameters.

When the bridge 20 is unbalanced, there is applied to amplifier 32 by way of filter 31 the alternating current voltage of 10,000 cycles per second, the filter 31 excluding therefrom the 1,000 cycle voltage. The output of amplifier 32 is applied to detector 33, similar in design and operation to detector 24, and including rectifiers 33a and 33b, output resistor 33c and a source through filter 34 and phase-shifter 35 of alternating current of 10,000 cycles per second. Since it is the resistive component to which detector 33 is to respond, phase-shifter 35 is adjusted so that the voltage applied between the center taps will be in phase with the in-phase component of the voltage applied by the secondary winding of transformer 33d to detector 33. Hence, there is produced a direct-current output whose magnitude will vary with the induced component of resistivity of winding 10b which in turn will depend upon the conductivity of the earth formation with which it is inductively coupled. While the output of detector 33 may be directly connected to indicating and/or recording apparatus, it is shown applying its output voltage to an amplifier 46 for operation of the marker to produce a record or trace 30c on the record-chart of changes in conductivity of the earth formations in correlation with the depth of the bore hole 11.

In the foregoing description of the operation of Fig. 3 it was tacitly assumed the balanceable circuit 20 had been adjusted for proper operation. The balancing of bridge 20 is relatively easy to accomplish by proper adjustment of the values of variable resistor 20b and of variable capacitor 20c. With inductance coil 10 suspended in air, bridge 20 is balanced for minimum, near zero, output for both the high-frequency and the low-frequency voltages. This requires adjustment of both the resistor 20b and capacitor 20c for balance of the resistive and reactive components of the bridge.

After bridge 20 is balanced, the phase-shifters 26 and 35 are then adjusted, one for quadrature and the other for in-phase measurement. A two or three-turn loop of copper wire, with a resistor in series therewith having a resistance which is high compared to the reactance of the loop, such as two to three thousand ohms, is then slid around winding 10b to be closely coupled thereto. Such a load induces a resistive component into the impedance of winding 10b and develops an in-phase unbalance signal from bridge 20. Phase-shifter 35 is then adjusted for maximum D.-C. signal from detector 33, and phase-shifter 26 is adjusted for minimum D.-C. signal from detector 24. To provide a check and to assure a more accurate adjustment, a capacitor is substituted for the resistor in series with the two or three-turn loop of copper wire. This capacitor should have a reactance at the lower frequency about equal in magnitude to the ohmic value of the resistor it replaces. Such a load induces a reactive component in the impedance of winding 10b and develops an out-of-phase unbalance signal from bridge 20. Phase-shifter 35 is then adjusted for minimum D.-C. signal from detector 33, and phase-shifter 26 is adjusted for maximum D.-C. signal from detector 24. Little or no readjustment will be required with this reactive unbalance after adjustment with the resistive unbalance. The two or three-turn loop is removed and the system is now ready for use in the manner already described for the measurement with high precision of the conductivity and the susceptibility of the earth formations.

The cable 47 preferably includes a strength member for suspension and movement of the exploration unit in the bore hole 11. The apparatus diagrammatically shown in Fig. 3 below the fragmentary part of cable 47 is compactly assembled to move as a unit with the coil assembly 10, only six conductors being necessary to the illustrated embodiment of the invention.

The frequencies of 1,000 cycles and 10,000 cycles per second are to be taken as suggestive only and not as limiting the invention since many different frequencies may be utilized. However, in accordance with the invention, wide separation of the frequencies utilized is advantageous. The single magnitude separation, as 1,000 cycles and 10,000 cycles, reduces cross-feed as between the detectors 24 and 33 by two magnitudes. This is important since the in-phase and quadrature-phase components at the respective frequencies will both change as the conductivity and susceptibility of the earth formations change. However, there will be a selective and disproportionate change in outputs of detectors 24 and 33. For example, it will be assumed that the ratio of the conductivity of the lower earth formation 12 to the conductivity of the upper earth formation 13 is equal to the ratio of the susceptibility of the upper formation 13 to the susceptibility of the lower earth formation 12.

The winding 10b in passing from a position adjacent the lower earth formation 12 to a position adjacent the upper earth formation 13 will, of course, produce a change in the output of the bridge 20. If in terms of Equation 6 only the foregoing changes be considered, the "quadrature" component of the unbalance at the output of detector 24 will be 10 times greater than the quadrature component at detector 33, provided the same gains are used in both channels. Similarly, the inphase component of detector 33 will be 100 times greater than the inphase component of detector 24.

The foregoing will be plainly seen by again referring to Equation 6 where the conductivity effects, $$\frac{\omega^2 M^2 R_{22}}{R_{22}^2 + (\omega L_{22})^2}$$

term, are proportional to the square of frequency, and the susceptibility effects are proportional to the first power of frequency ($jX_{11}$ term of the equation).

The degree to which the bridge 20 may be balanced and the ease of adjustment to best balance are dependent upon the approach of the components to pure inductance, capacitance and resistive elements. While satisfactory operation may be achieved with the arrangements of Figs. 1 and 3, optimum operation may be realized with the embodiment of the invention shown in Figs. 4 and 5.

Figure 4:
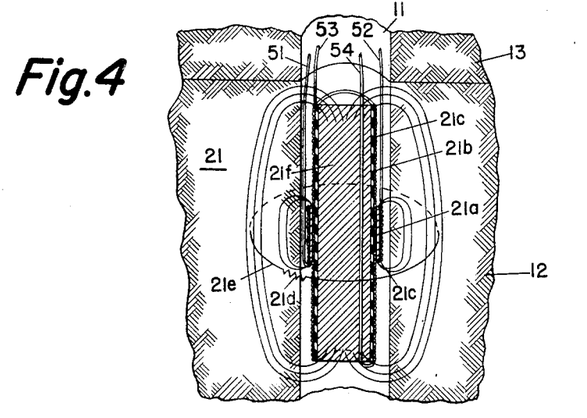
Fig. 4 is a schematic diagram of a two-winding inductance coil inductively coupled to the medium surrounding the bore hole.

Referring now to Fig. 4, an inductance coil assembly 21 is shown positioned in bore hole 11 adjacent an earth formation 12 located just below an earth formation 13 having different electrical characteristics. Coil 21 is a two-winding unit, having winding 21a for the lower frequency and winding 21b for the higher frequency. Conductors 51 and 52 extend upwardly from winding 21a, and conductors 53 and 54 extend upwardly from winding 21b. Winding 21a is of comparatively short length and large diameter, and is positioned at about the center, lengthwise, of the longer winding 21b, which is a smaller diameter winding of a length not exceeding about eight times the diameter of the bore hole. Winding 21a is supported and insulated from winding 21b by material 21c, while winding 21b is supported and insulated on coil form 21g. Core 21f is of a material of high magnetic permeability selected from materials suitable for magnetic cores at the frequencies supplied to coil 21. Powdered iron, ferrite, and iron strips finely laminated along lines parallel to the axis of coil 21 are typical suitable materials for the core 21f. As stated for inductance coil assembly 10, this core of high permeability material both increases the magnetic flux in the material surrounding coil 21 and concentrates most of the reluctance changes in the magnetic paths in the material surrounding coil 21. This increase in flux and concentration of reluctance change in the surrounding material increases the sensitivity of inductance coil assembly 21 to external changes.

Winding 21a is proportioned to provide a maximum ratio of inductance to resistance due to winding dimensions. In other words, the "Q" of winding 21a is made large, preferably near its maximum value. Winding 21a, being of larger diameter and shorter in length than coil 21b, will have less leakage flux and therefore is more susceptible to magnetic contrasts in the surrounding medium. Although winding 21a is much shorter than winding 21b, the number of turns in winding 21a is much greater than in winding 21b. This is done to make the bridge arm impedance approximately the same in bridge 20 and bridge 20a. The bridge arm impedance, generally in the order of 1000–5000 ohms, is a compromise between using high impedance for small values of condenser 20c and 20g against using high impedances and being subject to stray capacitance unbalancing the bridge.

Winding 21b is relatively long compared with the diameter of the bore hole in order that the current sheath linked thereto in the surrounding medium or earth formation shall be as large as possible. This current sheath is represented in Fig. 4 as an equivalent single-turn secondary winding 21e. The resistive loading caused by the conductivity of the surrounding medium is represented by equivalent series resistance 21d.

While equivalent resistor 21d will vary markedly with changes in the electrical conductivity of the earth formations surrounding coil 21, the full effect of this change does not appear across conductors 53 and 54 because it must be transferred thereto through the inductive coupling of the equivalent transformer having a secondary winding 21e and primary winding 21b. Because the coefficient of coupling between these windings is less than 100%, a considerable portion of the change in equivalent resistance 21d will be lost to the measuring circuit connected to conductors 53 and 54. From examination of the second term $$\frac{\omega^2 M^2 R_{22}}{R_{22}^2 + (\omega L_{22})^2}$$

of Equation 6, it will be seen that this induced resistive component varies with the square of the frequency applied. Accordingly, the higher the frequency applied to conductors 53 and 54 for measurement of this change in electrical conductivity, the more effective the transfer of resistance changes from the equivalent secondary circuit to primary winding 21b becomes. Accordingly, the higher frequency is applied to the winding 21b.

Equation 6 expresses the fundamental impedance relationships for both inductance coil 10 and inductance coil 21. However, in the case of the two-winding inductance coil 21, a separate Equation 6 would be required to express the impedance relationships for each winding 21a and 21b. For winding 21a, the first term, $jX_{11}$, is the important term inasmuch as it expresses the primary reactance which will change with variations in primary inductance as the magnetic susceptibility of the surrounding earth formation changes. The signal due to the second term, $$\frac{\omega^2 M^2 R_{22}}{R_{22}^2 + (\omega L_{22})^2}$$

is excluded by the phase-sensitive action of detector 24, while the third term, $$\frac{j\omega^3 M^2 L_{22}}{R_{22}^2 + (\omega L_{22})^2}$$

can be ignored because of the very low value of inductance $L_{22}$ for equivalent secondary loop 21e.

For winding 21b, the second term, $$\frac{\omega^2 M^2 R_{22}}{R_{22}^2 + (\omega L_{22})^2}$$

expresses the important change in the impedance of winding 21b that is utilized for the measurement of changes in electrical conductivity. Changes in the primary inductance of winding 21b, expressed in the first term, $jX_{11}$, are out of phase and discriminated against by phase-sensitive detector 33, while again the third term, $$\frac{j\omega^3 M^2 L_{22}}{R_{22}^2 + (\omega L_{22})^2}$$

can be neglected because of the very low value of $L_{22}$.

Having shown that the same basic theory underlies the two-winding embodiment of the inductance coil assembly, the embodiment illustrated in Fig. 5 will be described in detail. Inductance coil assembly 21 is schematically displayed, with winding 21a shown as more influenced by the variations in the magnetic susceptibility of the path surrounding winding 21a than by variations in the electrical conductivity in the equivalent secondary circuit consisting of equivalent winding 21e and equivalent resistance 21d. Winding 21b is schematically displayed as more influenced by the transformer relation to equivalent secondary winding 21e and equivalent secondary resistance 21d than by variations in the magnetic susceptibility of surrounding material. In order to accentuate the response due to changes in the electrical conductivity of the surrounding earth formations, winding 21b is energized with alternating current of high frequency, such as 10,000 cycles per second. Any suitable source 49 of such high frequency may be utilized. It is supplied to winding 21b by way of a bridge 20a.

In order to obtain the response to changes in magnetic susceptibility of the surrounding earth formations, winding 21a is energized with alternating current of low frequency such as 1,000 cycles per second. Any suitable source 48 of such low frequency may be utilized. It energizes winding 21a by way of bridge 20. By utilizing separate frequencies for the measurement of changes due to magnetic susceptibility and of changes due to changes in electrical conductivity, greater resolution of the two changes is obtained with less mutual interference between the changes. By utilizing separate bridges 20 and 20a, greater ease in calibrating the system is provided, since each bridge is required to balance only at a single frequency. Further, each bridge can be designed for maximum sensitivity and accuracy when utilized with the particular winding of inductance coil 21 that provides the signal of a particular phase and frequency, indicative of the variation to be measured.

When bridge 20 is unbalanced by changes in the impedance of winding 21a, a low-frequency unbalance signal is developed by bridge 20. Filter 22 applies this low-frequency signal to amplifier 23 and excludes the high-frequency voltage. The output of amplifier 23 is applied to phase-sensitive, frequency-selective detector 24 as described in connection with Fig. 3. The voltage supplied from low-frequency source 48 through phase-shifter 26 to detector 24 is adjusted in phase by phase-shifter 26 to be "in-phase" with the quadrature or out-of-phase component of the voltage applied to detector 24 by amplifier 25. The quadrature component of the low-frequency voltage output from bridge 20 varies with the susceptibility of the earth formations surrounding inductance coil 21, so the direct-current output from detector 24 will be proportional to the changes in magnetic susceptibility of the surrounding earth formations, due to the influence of these changes in magnetic susceptibility upon the impedance of winding 21a.

The output from detector 24 may be connected directly to an indicating and/or recording instrument or, as shown in Fig. 3, by way of an amplifier 45 to a recorder 30.

When bridge 20a is unbalanced by changes in the impedance of winding 21b, an in-phase, high-frequency unbalance signal will be developed by bridge 20a proportional to the impedance changes in winding 21b and the changes in electrical conductivity of the earth formations surrounding inductance coil 21. Filter 31 applies the high-frequency output from bridge 20a to amplifier 32 and excludes the low-frequency voltages. The output of amplifier 32 is applied to detector 33 similar in design and operation to the detector 24 and having the circuits shown for detector 33 in Fig. 3. Phase-shifter 35 applies some of the voltage from high-frequency source 49 to detector 33, and phase-shifter 35 is adjusted so that the voltage applied to detector 33 is in phase with the in-phase component of the high-frequency voltage from bridge 20a. Since this in-phase, high-frequency voltage is representative of changes in the electrical conductivity of the earth formations surrounding inductance coil 21 and the resulting impedance change in winding 21b, there is produced from detector 33 a direct-current output whose magnitude will vary with the induced resistive component of winding 21b which, in turn, will depend upon the conductivity of the earth formations with which it is inductively coupled.

While the output of detector 33 may be directly connected to indicating and/or recording apparatus, it can be connected to an amplifier 46 for operation of the marker producing trace 30c in recorder 30 as shown in Fig. 3. As described for Fig. 3, trace 30s produced by recorder 30 in response to direct-current output from detector 24 and trace 30c produced in response to output from detector 33, respectively will indicate the changes in magnetic susceptibility and electrical conductivity of the earth formations surrounding inductance coil 21 as a function of its position in the earth.

Figure 5:
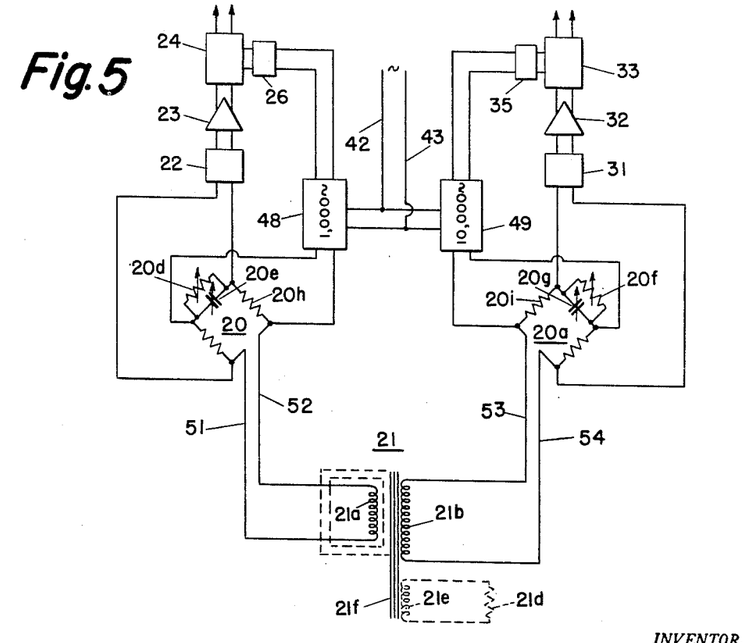
Fig. 5 is a diagrammatic view of a further embodiment of the invention having a two-winding inductance coil and a two-bridge balanceable circuit.

In the foregoing description of the operation of Fig. 5, it was tacitly assumed that the balanceable circuits 20 and 20a had been adjusted for proper operation. The balancing of bridge 20 is relatively easy to accomplish by proper adjustment of the values of variable resistor 20d and of variable capacitor 20e. Bridge 20a is similarly balanced by adjustment of the values of variable resistor 20f and of variable capacitor 20g.

Since windings 21a and 21b are commonly coupled to magnetic core 21f, it will be obvious to those skilled in the art that the loading which winding 21a sees between conductors 31 and 32, that is, the impedance of filter 22 in series with the resistor 20h of bridge 20, will be reflected by transformer action into winding 21b. Similarly, the loading which winding 21b sees between conductors 33 and 34, that is, the impedance of filter 31 in series with resistor 20i of bridge 20a, will be reflected by transformer action into winding 21a. Accordingly, it becomes highly desirable to have both filter 22 and filter 31 reject those frequencies which are objectionable.

The arrangement of Fig. 3, wherein oscillators 48 and 49 provide the low-frequency and high-frequency voltages from the surface to the exploration unit in the bore hole via conductors 42 and 43, can be utilized in Fig. 5 if desired. However, the alternate arrangement shown is utilized, wherein the sources of low-frequency and high-frequency voltages are contained within the bomb or exploration unit and conductors 42 and 43 serve only to supply power voltage to these oscillators.

With inductance coil 21 suspended in air, a resistive component is induced into the impedance of windings 21a and 21b by placing a two or three-turn copper loop around inductance coil 21 with resistance in series therewith whose ohmic value is high compared to the reactance of the loop at the frequencies used. The impedance of this secondary will be predominantly resistive, and hence the impedance change induced into the windings of inductance coil 21 also will be predominantly resistive. As this impedance change unbalances networks 20 and 20a, an output signal will appear. The high-frequency portion of the signal from bridge 20a will be passed by filter 31, amplified by amplifier 32 and applied to phase-sensitive detector 33. Since this is the in-phase signal for which detector 33 should produce a D.-C. output, phase-shifter 35 is adjusted until the output of detector 33 is at a maximum.

The low-frequency output from network 20 will be passed by filter 22, amplified by amplifier 23 and applied to phase-sensitive detector 24. Since this low-frequency signal is the in-phase component, it is not desired that detector 24 present a D.-C. output for this phase of signal. Accordingly, phase-shifter 26 is adjusted for minimum D.-C. output from detector 24.

A quadrature signal is developed by substituting a capacitor for the resistor in series with the two or three-turn loop. The capacitor should have a reactance about equal to the ohmic value of the resistor it replaces. This secondary will induce a reactive component in the windings of inductance coil 21, and will cause an unbalance signal to appear on the outputs of balanceable networks 20 and 20a. This output will be the quadrature signal which in actual measurement represents a change in magnetic susceptibility. It will be found that the high-frequency signal applied to detector 33 will be substantially out of phase with the signal applied through phase-shifter 35, so that little or no adjustment of phase-shifter 35 will be required to provide minimum D.-C. output from detector 33 for this quadrature component signal. The low-frequency signal applied to detector 24 will be found to be substantially in phase with the signal applied through phase-shifter 26, so that little or no readjustment of phase-shifter 26 will be required to provide maximum output from detector 24.

Phase-sensitive detectors 24 and 33 are well known in the art. Their operation is described on pages 206–209 of Servomechanism Fundamentals by Lauer, Lesnick and Matson (first edition—published 1947 by McGraw-Hill Book Co. Inc.). Briefly, detector 24 includes rectifiers 24a and 24b, and output resistor 24c. The rectifiers 24a and 24b are similarly poled with respect to the reference voltage applied to transformer 24d and are oppositely poled with respect to the signal voltage across the output from phase-shifter 26. The operation of the rectifiers is such that the D.-C. output across resistor 24c is proportional to the magnitude of the signal applied to transformer 24d which is in phase with the reference voltage from phase-shifter 26.

The circuit of detector 33 is the same both in construction and operation as detector 24. The D.-C. output across resistor 33c is proportional to the magnitude of the signal applied to transformer 33d which is in phase with the reference voltage from phase-shifter 35.

When the initial adjustments of phase-shifters 26 and 35 have been completed, with inductance coil 21 suspended in air, the bore-hole exploration unit is ready for lowering into a bore hole for logging purposes. When lowered into a bore hole, inductance coil 21 is magnetically coupled to the surrounding medium. The changes in its impedance produced by resistive and reactive components being induced therein by this coupling to the surrounding medium will be separated, detected and recorded as a function of the position of the exploration unit in the bore hole.

What is claimed is:

1. A system for measuring magnetic susceptibility and electrical conductivity comprising supply means for alternating voltage of different frequencies, balanceable circuit means connected to said supply means, inductive means connected to said balanceable circuit means and magnetically coupled to a surrounding medium, phase-sensitive detecting means responsive to an alternating voltage of one frequency connected to said circuit means and to said supply means to receive an alternating voltage of one frequency, and phase-sensitive detecting means responsive to alternating voltage of a different frequency connected to said circuit means and to said supply means to receive an alternating voltage of said different frequency, said detecting means measuring the unbalance signal of said circuit means in terms of the out-of-phase component of one frequency and the in-phase component of the different frequency whereby the magnetic susceptibility and electrical conductivity of the medium surrounding said inductance coil is measured.

2. A system for measuring the magnetic susceptibility and electrical conductivity of earth formations in a bore hole comprising inductive coupling means adapted for movement adjacent said earth formations in magnetically coupled relation therewith, voltage supply means for applying to said inductive coupling means alternating voltages at two frequencies of widely differing magnitudes, an electrical circuit including a filter for passing alternating current of a first of said frequencies and for excluding alternating current of the second of said frequencies, another electrical circuit including a filter for passing alternating current of said second frequency and excluding alternating current of said first frequency, means including at least one balanceable network connected between said filtering means and said inductive coupling means and to said voltage supply means, and means in circuit with the output from each of said filters for respectively indicating the in-phase component of the alternating current of one frequency and for indicating the out-of-phase alternating current component of the other frequency in measurement respectively of the magnetic susceptibility and the electrical conductivity of the earth formations adjacent which said inductive coupling means may be disposed.

3. A system for measuring magnetic susceptibility and electrical conductivity of earth formations in a bore hole comprising inductive coupling means adapted for movement adjacent said earth formations in magnetically coupled relation therewith, alternating-current supply means for applying to said inductive coupling means alternating currents of substantially different frequencies, circuit means including at least one balanceable network responsive to variations in the impedance of said inductive coupling means caused by changes in the electrical and magnetic characteristics of said earth formations coupled thereto, electrical circuits connected to said circuit means, one including a filter for passing alternating current of said one frequency and for excluding alternating current of said other frequency, another electrical circuit including a filter for including alternating current of said second frequency and excluding alternating current of said first frequency, and means in circuit with the output from each of said filters for respectively indicating the in-phase component of the alternating current of one frequency and for indicating the out-of-phase alternating current component of the other frequency in measurement respectively of the magnetic susceptibility and of the electrical conductivity of the earth formations adjacent which said inductive coupling means may be disposed.

4. A system for measuring magnetic susceptibility and electrical conductivity comprising a source of alternating voltages at differing frequencies, balanceable circuit means connected to said source of alternating voltages, inductive coupling means connected to said balanceable circuit means and magnetically coupled to a surrounding medium, phase-sensitive detecting means responsive to a first frequency output from said balanceable circuit means having a particular phase relation to the first frequency output from said source of alternating voltages, phase-sensitive detecting means responsive to a second frequency output from said balanceable circuit means having a particular phase relation to the second frequency output from said source of alternating voltages, whereby the output from said phase-sensitive detecting means respectively are indicative of the magnetic susceptibility and of the electrical conductivity of the medium surrounding said inductance coupling means.

5. Means for measuring the conductivity and susceptibility of earth formations comprising inductive means supported in magnetically coupled relation to an earth formation, means including a balanceable electrical circuit for applying to said inductive means alternating currents of widely differing frequency, said circuit being unbalanced with changes in conductivity and in susceptibility of said formation, means including a phase-sensitive detector for measuring the in-phase component of the unbalance signal of the higher frequency alternating current indicative of said change in conductivity, and means including a phase-sensitive detector for measuring the quadrature-phase component of the unbalance signal of the lower frequency alternating current as indicative of said change in susceptibility.

6. Means for measuring the conductivity and susceptibility of earth formations comprising inductive means supported in magnetically coupled relation to an earth formation, means including a balanceable electrical circuit for applying to said inductive means alternating currents of widely differing frequency, said circuit being unbalanced with changes in conductivity and in susceptibility of said formation, means including a phase-sensitive detector for measuring the in-phase component of the unbalance signal of the higher frequency alternating current indicative of said change in conductivity, and means including a phase-sensitive detector for measuring the quadrature-phase component of the unbalance signal of the lower frequency alternating current as indicative of said change in susceptibility, the in-phase component of said lower frequency alternating current and the quadrature-phase component of said high-frequency alternating current being of a materially lower order of magnitude than their respective components representative of magnetic susceptibility and of electrical conductivity.

7. In a system for measuring the conductivity and susceptibility of earth formations, inductive means positioned in magnetically coupled relation to an earth formation, means including balanceable circuit means for applying to said inductive means alternating currents of widely differing frequency, said circuit means being unbalanced with change in conductivity and in susceptibility of said formation, first frequency-selective means including a phase-sensitive detector for measuring the in-phase component at a first frequency of the unbalance signal from said circuit means indicative of said change in conductivity, and second frequency-selective means including a phase-sensitive detector for measuring the quadrature-phase component at a second frequency of the unbalance signal from said circuit means indicative of said change in susceptibility, the wide frequency separation of the unbalance signal at the first frequency and the unbalance signal at the second frequency providing considerable separation of the susceptibility and conductivity effects in their respective phase-sensitive detectors.

8. An apparatus for the measurement of changes in magnetic susceptibility and in electrical conductivity of earth formations, comprising a source of low-frequency current, a source of high-frequency current, inductive coupling means energized by said sources and magnetically coupled to the earth formation to be measured, and measuring means responsive to reactive changes in the impedance of said inductive coupling means to low-frequency current and responsive to resistive changes in the impedance of said inductive coupling means to high-frequency current, said reactive changes being representative of changes in magnetic susceptibility of earth formations and said resistive changes being representative of changes in electrical conductivity of earth formations.

9. An apparatus for the measurement of changes in electrical conductivity and magnetic susceptibility of a material, comprising a source of high-frequency voltage, a source of low-frequency voltage, inductive coupling means electrically excited by said sources of high-frequency and of low-frequency voltage and magnetically coupled to the material to be measured, measuring means responsive to reactive changes in the impedance of said inductive coupling means at low frequency, said reactive changes being representative of changes in the magnetic susceptibility of the material, and measuring means responsive to resistive changes in the impedance of said inductive coupling means at high frequency, said resistive changes being representative of changes in the electrical conductivity of the material.

10. A system for measuring changes in magnetic susceptibility and electrical conductivity comprising a source of a plurality of alternating voltages, balanceable circuit means connected to said source of alternating voltages, an inductance coil connected to said balanceable network and responsive to said alternating voltages, said inductance coil being coupled to the material to be measured whereby reactive changes are induced in the impedance of the inductance coil and are representative of the changes in magnetic susceptibility and whereby resistive changes are induced in the impedance of said inductance coil and are representative of changes in electrical conductivity, phase-sensitive detecting means responsive to a low-frequency output from said balanceable network representative of changes in magnetic susceptibility, and phase-sensitive detecting means responsive to a high-frequency output from said balanceable network representative of changes in electrical conductivity, whereby voltages representative of changes in magnetic susceptibility and in electrical conductivity are provided for indication and recording.

11. A system for logging bore holes by measuring the changes with depth of magnetic susceptibility and of electrical conductivity of the medium surrounding the bore hole and traversed by the bore hole, comprising a bomb adapted to be lowered into said bore hole, a balanceable network arranged in said bomb and adapted to receive a plurality of alternating voltages from sources thereof on the surface, an inductance coil arranged in said bomb, said inductance coil being connected to said balanceable network and magnetically coupled to the surrounding medium whereby reactive and resistive components are induced into the impedance of said inductance coil, and a plurality of phase-sensitive frequency-selective detectors arranged in said bomb and responsive to particular alternating voltages in the output from said balanceable network, said particular voltages being respectively representative of the changes in magnetic susceptibility and in electrical conductivity of the surrounding medium, conductors extending from said detectors to the surface, and means at the surface for indicating the changes in magnetic susceptibility and in electrical conductivity as a function of the position of the bomb in the bore hole.

12. In an electromagnetic bore hole logging system, a system for resolving signals representative of magnetic susceptibility and electrical conductivity, comprising an inductance coil having a high-frequency winding and a low-frequency winding, a source of high-frequency voltage connected to said high-frequency winding, a source of low-frequency voltage connected to said low-frequency winding, balanceable circuit means connected to said sources of high-frequency and low-frequency voltages and to said inductance coil, phase-sensitive detecting means connected to the output of said balanceable network and to said source of low-frequency voltages for measurement of low-frequency output from said balanceable network having a particular phase relation to said low-frequency voltage source, phase-sensitive detecting means connected to the output of said balanceable network and to said source of high-frequency voltage for measurement of a high-frequency output from said balanceable network having a particular relation to said source of high-frequency voltage, whereby variations in the magnetic susceptibility and electrical conductivity of the material surrounding said inductance coil are measured.

13. A system for measuring magnetic susceptibility and electrical conductivity of a medium surrounding a bore hole comprising a source of low-frequency voltage, a source of high-frequency voltage, a first balanceable network responsive to the low-frequency voltage and connected to said source of low-frequency voltage, a second balanceable network responsive to the high-frequency voltage and connected to said source of high-frequency voltage, an inductance coil having a first winding connected in the first balanceable network and a second winding connected in the second balanceable network, said inductance coil being magnetically coupled to the medium being measured to induce reactive changes in the first winding representative of changes in magnetic susceptibility and to induce resistive changes in the second winding representative of changes in electrical conductivity, a frequency-selective, phase-sensitive detector responsive to a low-frequency output from the first balanceable network, which output is indicative of changes in magnetic susceptibility, and a frequency-selective, phase-sensitive detector responsive to a high-frequency output from the second balanceable network, which output is indicative of changes in electrical conductivity.

14. An apparatus for the measurement of changes in electrical conductivity and in magnetic susceptibility of a material comprising a source of high-frequency voltage, a source of low-frequency voltage, inductive coupling means magnetically coupled to the material to be measured and having a first coil excited by said source of high-frequency and a second coil excited by said source of low-frequency, measuring means responsive to resistive changes in the impedance of said first coil at high frequency, said resistive changes being representative of changes in electrical conductivity of the material, and measuring means responsive to reactive changes in the impedance of said second coil at low frequency, said reactive changes being representative of changes in magnetic susceptibility of the material.

15. An apparatus for the measurement of changes in electrical conductivity and in magnetic susceptibility of a material comprising a source of high-frequency voltage, a source of low-frequency voltage, inductive coupling means magnetically coupled to the material to be measured and having a first coil whose length is several times longer than its diameter and which is excited by said source of high-frequency and having a second coil whose length is comparable to the diameter of said first coil and which is excited by said source of low-frequency, said second coil being symmetrical about the axis of said first coil, measuring means responsive to resistive changes in the impedance of said first coil at high-frequency, said resistive changes being representative of changes in electrical conductivity of the material, and measuring means responsive to reactive changes in the impedance of said second coil at low frequency, said reactive changes being representative of changes in magnetic susceptibility of the material.

ROBERT A. BRODING.

REFERENCES CITED

The following references are of record in the file of this patent:

UNITED STATES PATENTS

| Number | Name | Date |
| --- | --- | --- |
| 1,938,534 | Peters | Dec. 5, 1933 |
| 2,018,080 | Martienssen | Oct. 22, 1935 |
| 2,038,046 | Jakosky | Apr. 21, 1936 |
| 2,535,666 | Broding | Dec. 26, 1950 |